United States Patent [19]

Brandenstein et al.

[11] Patent Number: 4,537,270

[45] Date of Patent: Aug. 27, 1985

[54] BEARING ARRANGEMENT FOR A DRIVEN WHEEL OF A VEHICLE

[75] Inventors: Manfred Brandenstein, Eussenheim; Rüdiger Hans, Niederwerrn, both of Fed. Rep. of Germany

[73] Assignee: SKF Kugellagerfabriken GmbH, Schweinfurt, Fed. Rep. of Germany

[21] Appl. No.: 498,278

[22] Filed: May 26, 1983

[30] Foreign Application Priority Data

May 26, 1982 [DE] Fed. Rep. of Germany ....... 3219745

[51] Int. Cl.$^3$ .............................................. F16C 35/04
[52] U.S. Cl. .................................. 180/70.1; 180/259; 384/537
[58] Field of Search .............. 180/254, 259, 258, 70.1; 308/189 R; 384/537, 585

[56] References Cited

U.S. PATENT DOCUMENTS 3,583,511 6/1971 Ashberg .......................... 180/259 X
4,437,536 3/1984 Colanzi et al. ..................... 180/258

*Primary Examiner*—John A. Pekar
*Attorney, Agent, or Firm*—Daniel M. Rosen

[57] ABSTRACT

A bearing arrangement for a driven wheel of a vehicle, comprised of a rolling bearing whose outer ring is provided with a flange for affixing the assembly to a vehicle frame or the like. A wheel hub is provided with a flange for supporting a wheel. A drive joint is provided for driving the hub wheel, and a pin or the like is provided for holding the parts together. The axially engaging end surfaces of the wheel hub and drive joint are provided with engaging teeth for the transmission of torques. In order to interconnect the parts precisely to one another for centering and to ensure their reliable interconnection, the inner ring of the rolling bearing is mounted on the outer surface of the wheel hub and/or the drive joint, and end surfaces of the inner ring abut first shoulder surfaces of the wheel hub and the drive joint. The wheel hub and the drive joint directly abut one another at the end surfaces with are provided with substantially axially extending and intermeshing projections. The pin extends through the wheel hub and drive joint and engages second shoulder surfaces of both parts with radial projections.

4 Claims, 1 Drawing Figure

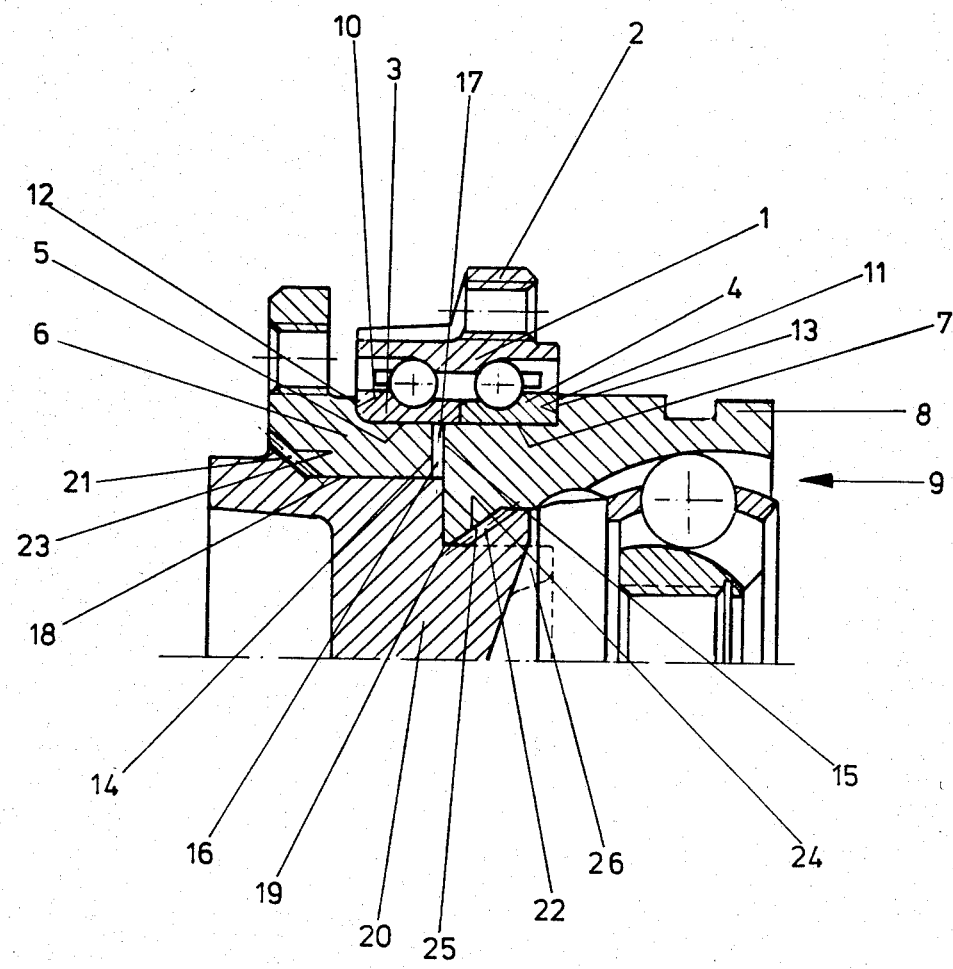

BEARING ARRANGEMENT FOR A DRIVEN WHEEL OF A VEHICLE

FIELD OF THE INVENTION

This invention relates to a bearing arrangement for a driven wheel of a vehicle.

BACKGROUND OF THE INVENTION

A bearing arrangement for the driven wheel of a vehicle is disclosed, for example in DE-OS No. 3014446, wherein the outer ring is provided with a radial flange for mounting on a wheel carrier or the like, and in which the inner ring extends between the wheel hub and the articulated drive joint. In this arrangement both ends of the inner ring are provided with axially extending projections for the transmission of torque. These projections engage corresponding axially extending projections on the wheel hub and the drive joint. The individual parts are held together by a threaded bolt which extends through the inner ring of the rolling bearing with large radial clearance and clamps the bearing inner ring. It is apparent that in this arrangement the inner ring must transmit torque and it can be distorted by the axial prestressing forces. In addition the bolt is not centered with respect to the interconnected parts without the provision of additional means. This can lead to the out-of-round running of the wheel and the drive joint. The axial prestress by threads of the bolt is furthermore not always insured. Thus, the threads may become deformed or the nut loosened, leading to such consequent severe accidents as the loss of the wheel.

SUMMARY OF THE INVENTION

It is therefore the object of the present invention to provide a bearing arrangement of the above type in which the parts are exactly centered and remain connected to one another in a simple and economical manner.

In accordance with the invention the wheel hub and the drive joint are centered satisfactorily with respect to the wheel bearing, the parts of the bearing arrangement are inextricably connected to one another. The inner bearing ring no longer must transmit torque and is thereby not unnecessarily overloaded. In this manner the prestress in the bearing can be readily controlled in a bearing having two rolling bearing rows and two inner rings.

BRIEF DESCRIPTION OF THE DRAWINGS

In order that the invention may be more clearly understood, it will now be disclosed in greater detail with reference to the accompanying drawing, which is a partial longitudinal sectional view of a bearing arrangement in accordance with the invention.

DETAILED DESCRIPTION OF THE PREFERRED EMBODIMENTS

In the driven wheel bearing of the drawing, the outer ring 1 is provided with a radial flange 2, the flange 2 being employed to affix the bearing arrangement to a vehicle frame (not illustrated) in conventional manner. The bearing has two inner rings 3 and 4 mounted on the outer surface 5 of the wheel hub 6 and on the outer surface 7 of the outer element 8 of a drive joint 9, such as a universal joint or articulated drive joint. The oppositely directed end faces 10 and 11 of the inner rings 3 and 4 laterally abut the shoulder surface 12 of the wheel hub 6 and the shoulder surface 13 of the outer element 8, respectively. The adjacent end surfaces 14 and 15 of the wheel hub 6 and outer body 8 contact one another, and are provided with projections 16 and 17 respectively that extend axially and intermesh in order to transmit torque from the outer element 8 to the wheel hub 6. In order to hold the parts together, a pin 20 extends through the bore 18 of the wheel hub 6 and the bore 19 of the outer element 8, the pin having radially directed projections 21 and 22 that engage the inner shoulder surface 23 of the wheel hub and the inner shoulder surface 24 of the outer element respectively. The shoulder surface of the outer element 8 of the drive joint 9 is provided with end teeth 25. Prior to affixing the parts together, the end of the pin 20 inserted in the outer element 8 extends directly axially, as illustrated in dashed lines at the reference numeral 26. After assembly of the outer element 8 on the end of the pin 20, the material 26 of the pin 20 is outwardly pressed by spin pressing or the like to form a projection 22 that engages the end teeth 25 of the outer element 8. The bearing can be accurately axially prestressed by the axial prestressing of the wheel hub 6 in the outer body.

While in the above-described embodiment of the invention the end surface 14 of the wheel hub and the end surface 15 of the outer body 8 extend approximately in the region of one of the rolling body rows of the wheel bearing, it is of course possible for this "separation joint" to extend in a different region, i.e., at the junction of the bearing inner rings. The shoulder surface 24 of the outer element 8, provided with the end teeth 25, may be inclined to the radial plane. It is also apparent that the shoulder surface 24 may be parallel to the radial plane. This is also true in the same manner for the shoulder surface 23 of the wheel hub 6. It is further noted that the projection 22 can be pre-formed on the pin 20, with the projection 21 then being formed after the assembly of parts, e.g. by stamping or spin pressing.

While the invention has been described with reference to a limited number of embodiments, it is apparent that variations and modifications may be made therein, and it is intended in the following claims to cover each such variation and modification that falls within the true spirit and scope of the invention.

What is claimed is:

1. In a bearing arrangement for the driven wheel of a vehicle, comprised of a rolling bearing having an outer ring with a flange for affixing the bearing arrangement to a vehicle frame and an inner ring, a wheel hub having a flange for supporting a wheel, a drive joint for driving said wheel hub, and means for holding said wheel hub, said drive joint and said inner ring together, the improvement wherein said wheel hub and said drive joint each have an end surface, a first shoulder surface, a second shoulder surface, and a bore surface, said inner ring being seated on the outer surface of at least one of said wheel hub and drive joint, between and in contact with said first shoulder surfaces, said end faces being arranged to confront each other and formed to engage each other in an interlocking relationship such that torque is transmitted from said drive joint to said wheel hub, and wherein said holding means comprises a pin extending through said wheel hub and drive joint and contacting said bore surfaces, said pin having radially extending projections arranged to engage said second shoulder surfaces of said wheel hub and drive joint, respectively.

2. The bearing arrangement of claim 1, wherein at least one of said second shoulder surfaces is provided with for teeth engaging the respective projections of said pin.

3. The bearing arrangement of claim 2, wherein said second shoulder surfaces provided with teeth are conical surfaces.

4. The bearing arrangement of claim 1, wherein said inner ring of the rolling bearing is comprised of two abutting rings.

* * * * *